US012412693B2

(12) United States Patent
Kim et al.

(10) Patent No.: US 12,412,693 B2
(45) Date of Patent: Sep. 9, 2025

(54) COIL ELECTRONIC COMPONENT

(71) Applicant: SAMSUNG ELECTRO-MECHANICS CO., LTD., Suwon-si (KR)

(72) Inventors: Yu Jong Kim, Suwon-si (KR); Young Do Choi, Suwon-si (KR); Seung Hee Kim, Suwon-si (KR); Jong Min Lee, Suwon-si (KR); Hye Yeon Jeon, Suwon-si (KR); Tae Ryung Hu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 883 days.

(21) Appl. No.: 16/573,340

(22) Filed: Sep. 17, 2019

(65) Prior Publication Data

US 2020/0126712 A1 Apr. 23, 2020

(30) Foreign Application Priority Data

Oct. 23, 2018 (KR) ........................ 10-2018-0126609

(51) Int. Cl.
*H01F 27/28* (2006.01)
*H01F 27/02* (2006.01)
(Continued)

(52) U.S. Cl.
CPC ....... *H01F 27/2804* (2013.01); *H01F 27/022* (2013.01); *H01F 27/29* (2013.01); *H01F 41/041* (2013.01); *H01F 2027/2809* (2013.01)

(58) Field of Classification Search
CPC ............. H01F 17/0013; H01F 27/2804; H01F 2027/2809; H01F 17/0006; H01F 5/003; H01F 27/29; H01F 27/292; H01F 27/022
(Continued)

(56) References Cited

U.S. PATENT DOCUMENTS

| | | | |
|---|---|---|---|
| 10,559,417 | B2 | 2/2020 | Ohkubo et al. |
| 2006/0214759 | A1 | 9/2006 | Kawarai |

(Continued)

FOREIGN PATENT DOCUMENTS

| | | | |
|---|---|---|---|
| CN | 104575946 | A | 4/2015 |
| CN | 106205956 | A | 12/2016 |

(Continued)

OTHER PUBLICATIONS

Office Action issued Nov. 15, 2023 issued for corresponding Chinese Patent Application No. 201911004647.0 (See English Translation).

(Continued)

*Primary Examiner* — Tszfung J Chan
(74) *Attorney, Agent, or Firm* — MORGAN, LEWIS & BOCKIUS LLP

(57) ABSTRACT

A coil electronic component includes a support substrate having a thickness of 20 to 40 μm. A coil pattern is disposed on at least one of a first surface and a second surface of the support substrate opposing each other, and has an aspect ratio of 4 or higher. An encapsulant encapsulates at least portions of the support substrate and the coil pattern, and an external electrode is disposed in an external region of the encapsulant and connected to the coil pattern.

11 Claims, 2 Drawing Sheets

I-I'

(51) Int. Cl.
*H01F 27/29* (2006.01)
*H01F 41/04* (2006.01)

(58) Field of Classification Search
USPC .................................................. 336/200, 232
See application file for complete search history.

(56) References Cited

U.S. PATENT DOCUMENTS

| | | | | |
|---|---|---|---|---|
| 2007/0085647 | A1* | 4/2007 | Kawarai | H01F 17/0006 336/83 |
| 2014/0285305 | A1* | 9/2014 | Yoo | H01F 27/255 336/200 |
| 2015/0102891 | A1 | 4/2015 | Yoon et al. | |
| 2015/0109088 | A1* | 4/2015 | Kim | H01F 17/0013 336/200 |
| 2016/0351316 | A1* | 12/2016 | Ohkubo | H01F 17/0006 |
| 2017/0032884 | A1 | 2/2017 | Choi et al. | |
| 2017/0178789 | A1* | 6/2017 | Kim | H01F 17/04 |
| 2017/0236633 | A1* | 8/2017 | Park | H01F 17/04 336/55 |
| 2017/0287621 | A1* | 10/2017 | Seino | H01F 1/26 |
| 2018/0033538 | A1 | 2/2018 | Yoon et al. | |
| 2020/0335254 | A1 | 10/2020 | Park et al. | |

FOREIGN PATENT DOCUMENTS

| | | | | | |
|---|---|---|---|---|---|
| CN | 106409469 | A | | 2/2017 | |
| JP | 2004-319570 | A | | 11/2004 | |
| KR | 10-1442402 | B1 | | 9/2014 | |
| KR | 10-2015-0068940 | A | | 6/2015 | |
| KR | 10-2016-0140487 | A | | 12/2016 | |
| KR | 2017014792 | A | * | 2/2017 | H01F 17/0006 |
| KR | 2017097883 | A | * | 8/2017 | H01F 17/0013 |
| KR | 10-2017-0108390 | A | | 9/2017 | |
| KR | 10-2018-0012618 | A | | 2/2018 | |
| WO | WO-2017160032 | A1 | * | 9/2017 | H01F 17/00 |
| WO | WO-2017171265 | A1 | * | 10/2017 | C25D 3/38 |

OTHER PUBLICATIONS

Office Action issued in corresponding Korean Patent Application No. 10-2018-0126609 dated Jan. 12, 2023, with English abstract.

Office Action issued in corresponding Chinese Patent Application No. 201911004647.0 dated Mar. 18, 2024, with English translation.

* cited by examiner

COIL ELECTRONIC COMPONENT

CROSS-REFERENCE TO RELATED APPLICATION(S)

This application claims benefit of priority to Korean Patent Application No. 10-2018-0126609 filed on Oct. 23, 2018 in the Korean Intellectual Property Office, the disclosure of which is incorporated herein by reference in its entirety.

BACKGROUND

1. Field

The present disclosure relates to a coil electronic component.

2. Description of Related Art

As electronic devices such as digital televisions, mobile phones, laptops, and the like, have been designed to have reduced sizes, demand has increased for coil electronic components configured for use in such electronic devices and having a reduced size. To meet such demand, a large number of studies into developing various types of coil-type or thin-film type coil electronic components have been conducted.

One important difficulty in developing a coil electronic component having a reduced size is to provide a coil component having the same properties as before after reducing a size thereof. To this end, a content of a magnetic material filling a core may be increased. However, there may be a limitation in increasing a content of the magnetic material due to strength of an inductor body, changes in frequency property caused by insulating property, and for other reasons.

There have been continuous attempts to further reduce a thickness of a chip including a coil electronic component. In particular, in the respective technical field, efforts have been made to provide devices providing high performance and reliability while having a reduced size.

SUMMARY

An aspect of the present disclosure is to provide a coil electronic component having improved direct current resistance property and Ls property.

According to an aspect of the present disclosure, a coil electronic component is provided, the coil electronic component including a support substrate having a thickness of 20 to 40 μm. A coil pattern is disposed on at least one of a first surface and a second surface of the support substrate opposing each other, and has an aspect ratio of 4 or higher. An encapsulant encapsulates at least portions of the support substrate and the coil pattern, and an external electrode is disposed in an external region of the encapsulant and connected to the coil pattern.

When a region of the encapsulant covering the coil pattern is defined as a cover portion, a thickness of the cover portion may be less than a thickness of the coil pattern.

The thickness of the coil pattern may be two or more times the thickness of the cover portion.

The aspect ratio of the coil pattern may be 10 or higher.

A thickness of the coil pattern may be three or more times the thickness of the support substrate.

The coil pattern may be disposed on both of the first surface and the second surface of the support substrate.

The encapsulant may include magnetic grains and an insulating resin.

The encapsulant may fill a region between adjacent winding patterns of the coil pattern.

According to another aspect of the present disclosure, a coil electronic component includes a support substrate having first and second surfaces opposite each other in a thickness direction. A coil having a first coil pattern is disposed on the first surface, and has a thickness measured in the thickness direction that is three or more times a thickness of the support substrate measured in the thickness direction. An encapsulant encapsulates at least portions of the support substrate and the coil pattern.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
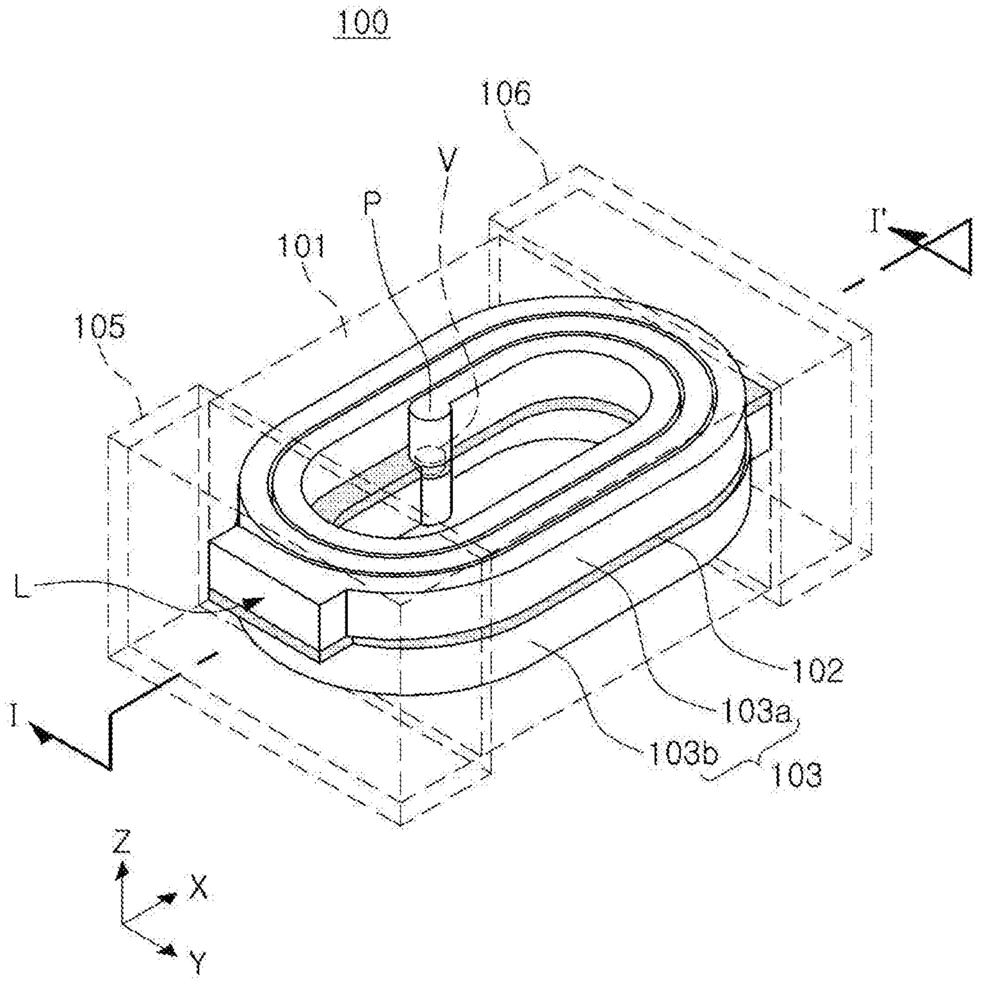
FIG. 1 is a perspective diagram illustrating a coil electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numerals.

Figure 2:
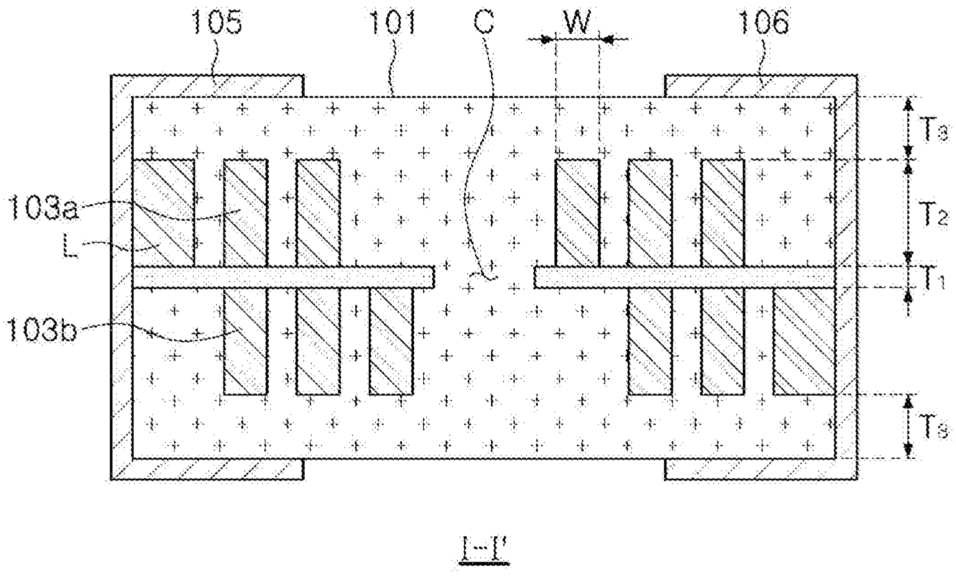
FIG. 2 is a cross-sectional diagram taken along line I-I' in FIG. 1.

FIG. 1 is a perspective diagram illustrating a coil electronic component according to an example embodiment. FIG. 2 is a cross-sectional diagram taken along line I-I' in FIG. 1.

Referring to the diagrams, a coil electronic component 100 in the example embodiment may include an encapsulant 101, a support substrate 102, a coil pattern 103, and external electrodes 105 and 106. The support substrate 102 may be configured to have a reduced thickness and the coil pattern 103 may be configured to have a relatively high aspect ratio such that electronic and magnetic properties may improve.

The encapsulant 101 may encapsulate at least portions of the support substrate 102 and the coil pattern 103, and may form an exterior of the coil electronic component 100. In example embodiments, a length (a length taken in an X direction in FIG. 1) of the encapsulant 101 may be greater than a thickness (a length taken in a Z direction in FIG. 1), and a ratio of a thickness to a length of the encapsulant 101 may be 0.6 or lower approximately. The coil electronic component 100 having a reduced thickness as described above may be a low profile component. In the case of the coil electronic component 100 having a low profile form, there may be a limitation in increasing a size of the coil pattern 103 such that it may be difficult to improve electronic and magnetic properties. In the example embodiment, aspect ratios of the support substrate 102 and the coil pattern 103 may be limited to a certain range to improve such property.

The encapsulant 101 may be configured to partially expose a lead-out pattern L. The encapsulant 101 may include magnetic grains, and an insulating resin may be interposed between the magnetic grains. Surfaces of the magnetic grains may be coated with an insulating film. As the magnetic grains included in the encapsulant 101, ferrite, a metal, and the like, may be used. When the magnetic grains are configured as a metal, the magnetic grains may be an Fe-based alloy, and the like. For example, the magnetic grains may be a nanocrystalline grain boundary alloy having a composition of Fe—Si—B—Cr, an Fe—Ni based alloy, and the like. As an example, a grain size of an Fe-based alloy grain may be 0.1 μm or greater to 20 μm or less, and the Fe-based alloy grains may be distributed on a macromolecule phase such as an epoxy resin or polyimide. When the magnetic grains are implemented by an Fe-based alloy as described above, however, although magnetic property such as permeability, and the like, may be improved, the magnetic grains may be vulnerable to electrostatic discharge. Accordingly, an additional insulation structure may be interposed between the coil pattern 103 and the magnetic grains. Also, the encapsulant 101 may fill a region between adjacent patterns in the coil pattern 103 as illustrated in the diagram.

The support substrate 102 may support the coil pattern 103, and may be implemented as a polypropylene glycol (PPG) substrate, a ferrite substrate or a metal-based soft magnetic substrate, and the like. As illustrated in the diagram, a through hole C may be formed in a central portion of the support substrate 102, penetrating through the support substrate 102, and the through hole C may be filled with the encapsulant 101, thereby forming a magnetic core portion. In the example embodiment, a thickness $T_1$ of the support substrate 102 may be configured to be 20 to 30 μm, which is less than a thickness of a support substrate used in a general coil electronic component. By configuring the thickness $T_1$ of the support substrate 102 to be less than a thickness of a support substrate used in a general coil electronic component, a thickness $T_2$ of the coil pattern 103 may increase and an amount of the encapsulant 101 filling the region between the patterns of the coil pattern 103 may also increase. Thus, as the thickness $T_2$ of the coil pattern 103 increases, direct current resistance Rdc property may improve with reference to a component having the same thickness, and as the amount of magnetic grains included in the encapsulant 101 increases, Ls property may also improve.

The coil pattern 103 may be disposed on at least one of a first surface (an upper surface in FIG. 2) and a second surface (a lower surface in FIG. 2) of the support substrate 102 opposing each other. In the example embodiment, the coil pattern 103 may include a first coil pattern 103*a* disposed on the first surface of the support substrate 102 and a second coil pattern 103*b* disposed on the second surface, but an example embodiment thereof is not limited thereto. The coil pattern 103 may be disposed on only one surface. The first and second coil patterns 103*a* and 103*b* may include a pad region P, and may be connected to each other through a via V penetrating through the support substrate 102. The coil pattern 103 may be formed by a plating process generally used in the respective technical field, such as a pattern plating process, an anisotropic plating process, an isotropic plating process, or the like, and the coil pattern 103 may be configured to have a multilayer structure using a plurality of processes from among the aforementioned processes.

The external electrodes 105 and 106 may be disposed externally of the encapsulant 101 and may each be connected to a respective lead-out pattern L. The external electrodes 105 and 106 may be formed using a paste including a metal having a high electrical conductivity, and the paste may be a conductive paste including one of nickel (Ni), copper (Cu), tin (Sn) or silver (Ag), or alloys thereof, for example. Each of the external electrodes 105 and 106 may further include a plating layer formed thereon. In this case, the plating layer may include one or more elements selected from a group consisting of nickel (Ni), copper (Cu), and tin (Sn). For example, a nickel (Ni) plated layer and a tin (Sn) plated layer may be formed in order.

The lead-out pattern L may be disposed in an outermost region of the coil pattern 103, may provide a connection path with the external electrodes 105 and 106, and may be configured to be integrated with the coil pattern 103. In this case, as illustrated in the diagram, the lead-out pattern L may be configured to have a width greater than a width W of the coil pattern 103 to be connected to the external electrodes 105 and 106. The width may be a width taken in the X direction in FIG. 1.

In the example embodiment, an aspect ratio of the coil pattern 103, a ratio of the thickness $T_2$ to the width W, may be 4 or higher. As described above, when the support substrate 102 is configured to have a reduced thickness, an aspect ratio of the coil pattern 103 may effectively increase. When an aspect ratio of the coil pattern 103 increases, a size of a cross-sectional surface of the coil pattern 103 may also increase such that direct current resistance property of the coil electronic component 100 may decrease. The more the cross-sectional surface of the coil pattern 103 increases, the more the direct current resistance of the coil pattern 103 may decrease.

In this case, an aspect ratio of the coil pattern 103 may increase in accordance with required properties, and may be 10 or higher, for example. As a thickness of the support substrate 102 decreases and a thickness of the coil pattern 103 increases, an amount of the encapsulant 101 filling a region between the adjacent winding patterns of the coil pattern 103 may also increase such that an amount of the magnetic grains included in the encapsulant 101 may also increase. The increase of the amount of the magnetic grains included in the encapsulant 101 may affect improvement of magnetic property of the coil electronic component 100, and may improve/increase Ls property. The thickness $T_2$ of the coil pattern 103 may be three or more times the thickness $T_1$ of the support substrate 102. In this case, direct current resistance property may decrease and Ls property may improve/increase without increasing a thickness of the coil electronic component 100.

When a region of the encapsulant 101 covering the coil pattern 103 may be defined as a cover portion, a thickness $T_3$ of the cover portion may be less than the thickness $T_2$ of the coil pattern 103. The thickness $T_3$ may refer to a thickness of an upper cover portion covering the first coil pattern 103*a* or a lower cover portion covering the second coil pattern 103*b*. The thickness $T_2$ of the coil pattern 103 may be two or more times the thickness $T_3$ of the cover portion. By configuring a thickness of the coil pattern 103 to be greater than the thicknesses of the support substrate 102 and of the cover portion as described above, direct current resistance property may decrease and Ls property of the coil electronic component 100 may improve.

The inventors manufactured coil electronic components under the conditions as below, and compared the direct current resistance property and Ls property of the coil electronic component of an embodiment and of the coil electronic component of a comparative example with each other. In the two manufactured components, a length of a coil pattern was configured to be the same, 2000 μm. Also, overall thicknesses of the components were the same.

(1) Comparative Example a width of a coil pattern: 10 μm
a thickness of a coil pattern: 100 μm
a thickness of a support substrate: 60 μm (2) Embodiment a width of a coil pattern: 10 μm
a thickness of a coil pattern: 115 μm
a thickness of a support substrate: 30 μm As a result of the comparison between the components implemented as above, when direct current resistance property of the comparative example is 100%, direct current resistance property of the embodiment improved to 87%. As for an Ls property, when the Ls property of the comparative example is 100%, the Ls property of the embodiment increased to 115%. Thus, by using the coil pattern having a relatively high aspect ratio and the support substrate having a reduced thickness suggested in the example embodiment, direct current resistance may be reduced and inductance may increase as compared to a general component having the same thickness.

According to the aforementioned example embodiments, even when a thickness of the coil electronic component is reduced, direct current resistance property may decrease and Ls property of the component may improve/increase.

While the exemplary embodiments have been shown and described above, it will be apparent to those skilled in the art that modifications and variations could be made without departing from the scope of the present invention as defined by the appended claims.

What is claimed is:

1. A coil electronic component, comprising:
a support member having a thickness of 20 to 40 μm;
a coil pattern disposed on at least one of a first surface and a second surface of the support member opposing each other, and having an aspect ratio of 11.5 or higher;
an encapsulant encapsulating at least portions of the support member and the coil pattern; and
an external electrode disposed in an external region of the encapsulant and connected to the coil pattern,
wherein a thickness of the coil pattern is two or more times a distance from an upper surface of the encapsulant to the coil pattern, and
wherein a ratio of a thickness to a length of the encapsulant is 0.6 or lower.

2. The coil electronic component of claim 1, wherein the thickness of the coil pattern is three or more times the thickness of the support member.

3. The coil electronic component of claim 1, wherein the coil pattern is disposed on both of the first surface and the second surface of the support member.

4. The coil electronic component of claim 1, wherein the encapsulant includes magnetic grains and an insulating resin.

5. The coil electronic component of claim 4, wherein the encapsulant fills a region between adjacent winding patterns of the coil pattern.

6. The coil electronic component of claim 1, wherein
the first and second surfaces oppose each other in a thickness direction;
the coil pattern has a first coil pattern disposed on the first surface, and has a thickness in the thickness direction that is three or more times the thickness of the support member in the thickness direction.

7. The coil electronic component of claim 6, wherein the coil pattern further includes:
a second coil pattern disposed on the second surface, and having a thickness in the thickness direction that is three or more times the thickness of the support member in the thickness direction; and
a conductive via extending through the thickness of the support member to connect the first and second coil patterns to each other.

8. The coil electronic component of claim 6, wherein the encapsulant includes magnetic grains, the first coil pattern includes a plurality of windings, and the magnetic grains of the encapsulant extend into a space between adjacent windings of the plurality of windings.

9. The coil electronic component of claim 8, wherein the magnetic grains of the encapsulant extend into the space between the adjacent windings of the plurality of windings to a depth, measured in a thickness direction from a surface of the first coil pattern opposite to the first surface, that is three or more times the thickness of the support member.

10. The coil electronic component of claim 6, wherein the first coil pattern extends in the thickness direction between a base surface contacting the first surface of the support member and a peripheral surface opposite the base surface, and the encapsulant forms a cover portion extending over the peripheral surface of the first coil pattern and having a thickness that is half or less of the thickness of the first coil pattern.

11. The coil electronic component of claim 1, wherein the thickness of the support member is 20 to 30 μm.

* * * * *